United States Patent [19]
Guenter et al.

[11] 3,867,376
[45] Feb. 18, 1975

[54] BIS-S-TRIAZIN-YLAMINO-STILBENE-2,2'-DISULPHONIC ACIDS

[75] Inventors: Franz Guenter, Riehen; Werner Fringeli, Basel; Peter Liechti, Binningen, all of Switzerland

[73] Assignee: Ciba-Giegy AG, Basel, Switzerland

[22] Filed: June 27, 1972

[21] Appl. No.: 266,848

[30] Foreign Application Priority Data
July 16, 1971 Switzerland...................... 10480/71

[52] U.S. Cl............ 260/240 B, 96/82, 117/33.5 R, 117/33.5 T, 162/162, 252/301.2 W
[51] Int. Cl............................................ C09b 23/00
[58] Field of Search ................................ 260/240 B

[56] References Cited
UNITED STATES PATENTS
2,945,762  7/1960  Carroll et al............... 260/240 B X FOREIGN PATENTS OR APPLICATIONS
1,576,479  6/1969  France ........................... 260/240 B
1,104,966  4/1961  Germany........................ 260/240 B
1,190,855  5/1970  England ......................... 260/240 B

*Primary Examiner*—John D. Randolph

[57] ABSTRACT

The present invention provides 4,4'-bis-[4,6-di-(2-sulpho)-anilino-1,3,5-triazinyl-(2)-amino]-stilbene-2,2'-disulphonic acids, which are useful fluorescent whitening agents, especially in the surface coating treatment of paper.

1 Claim, No Drawings

BIS-S-TRIAZIN-YLAMINO-STILBENE-2,2'-DISULPHONIC ACIDS

The present invention relates to new bis-s-triazinylaminostilbene-2,2'-disulphonic acids, process for their manufacture and their use as fluorescent whitening agents in the surface coating treatment of organic materials containing cellulose and polyamides, especially of paper.

It is known that substrates containing cellulose and polyamides can be optically brightened with bis-s-triazinylamino-stilbene-2,2'-disulphonic acids. For example, a process for the fluorescent whitening of photographic paper with such compounds is described in U.S. Pat. No. 3,269,840.

There has now been discovered a class of new bis-s-triazinylamino-stilbene-2,2'-disulphonic acids which are surprisingly superior to structurally similar, known bis-s-triazinylamino-stilbene-disulphonic acids, particularly in regard to the use for whitening paper in the surface coating treatment.

The new compounds correspond to the formula (1) 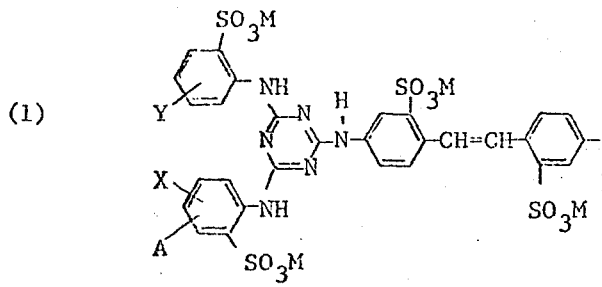 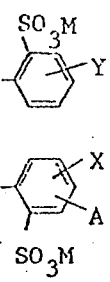

wherein X and Y independently represent hydrogen, alkyl or alkoxy containing from 1 to 4 carbon atoms, preferably methyl or methoxy, halogen, preferably chlorine, and A represents hydrogen or a radical $-SO_3M$ in the 4- or 5-position, and M represents a hydrogen, alkali metal (e.g., sodium or potassium), alkaline earth (e.g., calcium), earth metal (e.g., aluminium), ammonium or amine salt ion or an equivalent thereof.

A particularly preferred compound, however, is that of the formula (2) 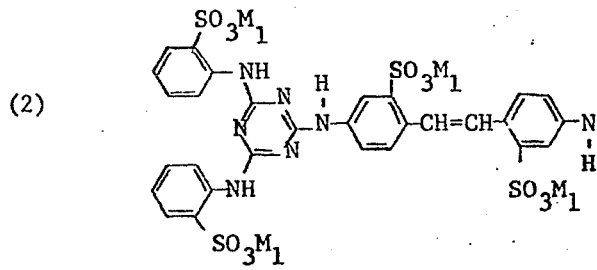 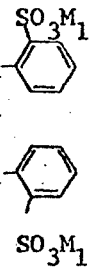

wherein $M_1$ represents a hydrogen, sodium, potassium or ammonium ion.

The compounds of the formula (1) are manufactured by processes which are known in the art. For example, it is possible to react 2 moles of a compound of the formula (3) 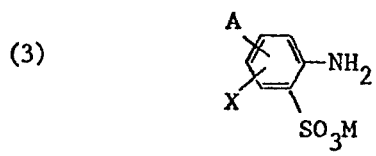

wherein X, A and M have the meanings given hereinbefore, in an aqueous medium and optionally in the presence of acid binding agents, initially with 2 moles of cyanuric chloride, then to react the primary product with 1 mole of 4,4'-diaminostilbene-2,2'-disulphonic acid or its salts, and finally to react the resulting product with 2 moles of a compound of the formula (4) 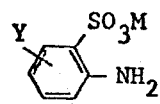

wherein Y and M have the meanings given hereinbefore.

In the first step, it is of course also possible to react 1 mole of 4,4'-diamino-stilbene-2,2'-disulphonic acid initially with 2 moles of cyanuric chloride and then to react the primary product initially with 2 moles of a compound of the formula (3) and then to react the resulting product with 2 moles of a compound of the formula (4).

The compound of the formula (2) are obtained correspondingly.

The first reaction step is carried out preferably at temperatures below 10°C, the second at 0°–30°C and the last step at 50°–100°C. Suitable acid binding agents which may optionally be used are alkali carbonates, bicarbonates, hydroxides or acetates. The reaction may be carried out both in a purely aqueous medium and in a mixture of water and hydrophilic organic solvents which are insert towards the reactants. Solvents of this kind are chiefly low molecular ketones, such as acetone or methyl ethyl ketone. The very readily water-soluble end products of the formula (1) and (2) are precipitated from their aqueous solutions in easily filterable form by salting out, for example with alkali chlorides. Another method of isolating them consists in evaporating the reaction solutions to dryness; but less pure products are obtained by this latter method of isolation.

Suitable anilinesulphonic acids of the formula (3) are chiefly orthanilic acid, 2,4-disulphoaniline, 2,5-disulphoaniline, 2-sulpho-4-methyl-aniline, 2-sulpho-5-methylaniline, 2-sulpho-5-chloro-aniline, 2-sulpho-4-ethoxy-aniline. With the exception of the disulphonic acids, the above compounds are also suitable for the compounds of the formula (4).

The salts of the new stilbene compounds can be converted into the free sulphonic acids by treatment with strong mineral acids, e.g., 20 percent hydrochloric acid. It is then possible to obtain the mostly very readily water-soluble amine salts from the free sulphonic acids by neutralisation with ammonia or readily soluble primary, secondary or tertiary aliphatic or hydroaromatic amines. By a less severe acid treatment of the alkali salts of the new stilbene compounds it is also possible to manufacture acid salts, which likewise can be converted into very readily soluble products by neutralisation with low molecular amines.

The new fluorescent whitening agents, which in the form of their sodium or potassium salts are colourless to slightly yellowish powders, are so readily soluble in water that it is possible to prepare 10–25 percent liquid preparations, a fact that is greatly appreciated by the consumers.

The compounds according to the invention are suitable for the fluorescent whitening of textile materials made from cellulose and natural or synthetic polyamides, and especially of paper.

When using them for the fluorescent whitening of textile materials, it is possible to add the compounds according to the invention to suitable textile treatment liquors, such as finishing liquors, and to cleasing agents, which may be used, for example, for washing household linen.

For the fluorescent whitening of paper, the compounds according to the invention can be added both to the pulp and— with particular advantage — used in the surface finishing.

The term "surface coating treatment" is intended to cover all operations which are concerned with the finishing of crude paper by coating it with a finishing agent.

The surface finishing of paper is generally carried out in actual practice by the following methods:

A. the so-called "starch coating" within the paper machine, e.g., in a sizing press, or
B. the so-called "pigment coating" within or outside the paper machine.

For the starch coating (surface sizing according to A), aqueous size liquors are used which contain as a rule per litre 0.1 to 8 g, e.g., 0.2 to 5 g, of fluorescent whitener of the formula (1), 10 to 200 g/l, e.g., 20 to 150 g/l, preferably 50 to 100 g/l, of bonding agent per litre and optionally a small amount of conventional wetting agents.

For the pigment coating to (B), coating liquous are used as a rule which contain per litre 0.1 to 8 g, e.g., 0.2 to 5 g, of fluorescent whitener of the formula (1), 50–700 g/l, e.g., 350–650 g/l, of white pigment and optionally (relative to the weight of the white pigment or pigments used) 8–30% of a binder, 0.2–0.6% of metal binding agents and 0.1 to 0.3% of wetting agent.

Suitable binders are, for example, decomposed starches, alginates, polyvinyl alcohol, polyvinyl pyrrolidone, carboxymethyl cellulose, proteins (e.g., gelatine, casein), aqueous synthetic resin dispersions based on butadiene-styrene or acrylic polymers or copolymers, or mixtures of these binders.

Wetting agents are, for example, unsulphated or sulphated higher alkanol- or alkylphenol polyglycol ethers with an alkyl radical containing from 8–14 carbon atoms and 1–20 ethylene oxide groups.

As white pigments it is possible to use e.g., aluminium magnesium silicates (china clay), calcium carbonate, $CaSO_4.10H_2O$ (satin white), aluminium silicates and hydroxides, barium sulphate (blanc fixe) or titanium dioxide or mixtures of such white pigments. Furthermore, the coating liquors may contain metal binding agents, e.g., water-soluble poly- or metaphosphates + polycarboxylic salts, in order to eliminate undesirable traces of metal (e.g., $Fe^{III}$).

In order to obtain good flow properties it is advantageous to use an alkaline coating liquor for the pigment coating. The alkaline reaction is advantageously adjusted with ammonium hydroxide or with sodium or potassium hydroxides, carbonates or borates or mixtures thereof.

With these coating liquors according to (A) and (B) the paper is advantageously coating in a coating device conventionally used for this purpose. Paper is thereby obtained which display a whiter and more pleasing appearance in addition to an improved surface and printability.

In the surface finishing process the paper is coated in known manner, in the course of which the solutions of fluorescent whitening agents are added to the already prepared size liquors or coating liquors.

As a rule aqueous solutions of fluorescent whitening agents of 0.01–5%, preferably 0.05–2%, are used.

EXAMPLE 1

While stirring thoroughly, a warm solution of 147.6 g (0.8 mole) of cyanuric chloride in 400 ml of acetone is poured into a mixture of 800 g of ice and 400 g of water. A solution of 148 g (0.4 mole) of 4,4'-diaminostilbene-2,2'-disulphonic acid and 32 g of sodium hydroxide in 700 ml of water is added to the resulting suspension, in the course of which the temperature rises from −10°C to −1°C and the pH falls rapidly below 2. Then 80 ml of 10N NaOH is added dropwise within 20 to 30 minutes in such a manner that the pH slowly rises to 6 – 6.5 and stirring is continued until the detection of aromatic amino groups is practically negative. Orthanilic acid (304 g, 1.76 moles) and sodium hydroxide (64 g, 1.6 moles) in 200 ml of water were then added, the suspension was then heated within 1 hours to 96°–97°C and the bulk of the acetone distilled off in the process. The pH is kept between 3.0 and 3.5 by the dropwise addition of 10N sodium hydroxide solution. The uptake of sodium hydroxide ceases after stirring for 4 hours at 96° to 97°C. The pale yellow suspension is adjusted to pH 8, the product precipitated by adding 90 f of sodium chloride, filtered off after cooling, washed with 5 percent sodium chloride solution and dried in vacuo at 80°C, to give 530 to 580 g of pale yellow crystalline powder containing 83 to 90 percent of the compound of the formula (5) 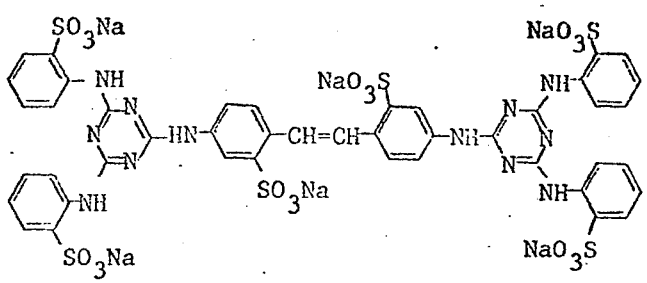

EXAMPLE 2

While stirring, a warm solution of 73.8 g (0.4 mole) of cyanuric chloride in 200 ml of acetone is poured into a mixture of 600 g of ice and 1,000 ml of water. A solution of 101.3 g (0.4 mole) of 1-anilino-2,5-disulphonic acid and 16 g of sodium hydroxide in 400 ml of water is added to the resulting suspension in such a manner that the temperature does not rise above +5°C. The acid which is liberated in the process is neutralised with 137 ml of 2.5N sodium carbonate solution, a pH of between 3 and 4 being manitained. The mixture is stirred for 2–3 hours at pH 3–4 and 0°–5°C. To the clear reaction solution are added 74 g (0.2 mole) of 4,4'-diaminostilbene-2,2'-disulphonic acid and 16 g of sodium hydroxide in 500 ml of water, the pH is kept between 6 and 7 by the dropwise addition of 80 ml of 10N sodium hydroxide solution and the solution is stirred for 3 hours at 20°–30°C. Then 76.2 g (0.44 mole) of orthanilic acid and 16 g of sodium hydroxide in 500 ml of water are added, the solution is heated within 1 hour to 96°–97°C and the bulk of the acetone distilled off in the process. A pH between 3 and 3.5 is maintained by the dropwise addition of 10N sodium hydroxide solution. The pH is adjusted to 7 with 10N sodium hydroxide solution after Stirring for 4 hours at 96°–97°C and the octa-disodium-4,4'-bis-[2-(2-sulphophenylamino)-4-(2,5-disulphophenylamino)-s-triazinyl-(6)-amino]-stilbene-disulphonate is precipitated by adding 700 g of sodium chloride. The suspension is cooled, then filtered, the product washed with 15 percent saline solution and dried in vacuo at 80°C to give 283–296 g of a pale yellow, readily water-soluble powder containing 80–85% of the compound of the formula

EXAMPLE 3

While stirring, a solution of 18.4 parts by weight of cyanuric chloride in 80 parts by weight of acetone is passed into 400 parts by weight of an ice/water mixture. While stirring, a solution of 21.2 parts by weight of 4-amino-toluene-3-sulphonic acid and 4 parts by weight of sodium hydroxide in 100 parts by weight of water is added dropwise to the resulting suspension within 30 minutes at 0°–5°C. A pH of 3–4 is maintained by the simultaneous dropwise addition of about 35 parts by weight of a 3N sodium carbonate solution. The mixture is then allowed to continue to react for about 2 hours at 0°–5°C and pH 3 to 4. Then a solution of 25.2 parts by weight the sodium salt of 4,4'-diaminostilbene-2,2'-disulphonic acid in 125 parts by weight of water is added and the mixture is heated for 2 hours to 25°–30°C, in the course of which the pH is kept between 6 and 7 by adding about 40 parts by weight of 3N sodium carbonate solution. Finally, a solution of 23.3 parts by weight of 4-amino-toluene-3-sulphonic acid and 4.5 parts by weight of water is added and the mixture is heated for 5 hours to 90°–95°C while distilling off the acetone, the pH being kept between 3 and 3.5 by gradually adding 3N sodium carbonate solution. The pH of the solution is subsequently adjusted to 7 by adding 3N sodium carbonate solution and the hexa-sodium salt of 4,4'-bis-[2,4-di-(4-methyl-2-sulphophenylamino)-s-triazinyl-(6)-amino]-stilbene-disulphonic acid is precipitated by adding 75 parts by weight of sodium chloride. The batch is cooled, the product collected by suction filtration, washed with 5% saline so- (6) 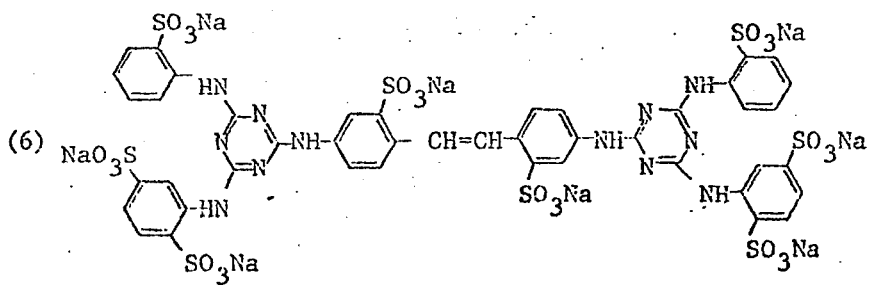

lution and dried in vacuo at 80°C to give 63 parts by weight of a pale yellow, readily water-soluble powder of the compound of the formula (7)

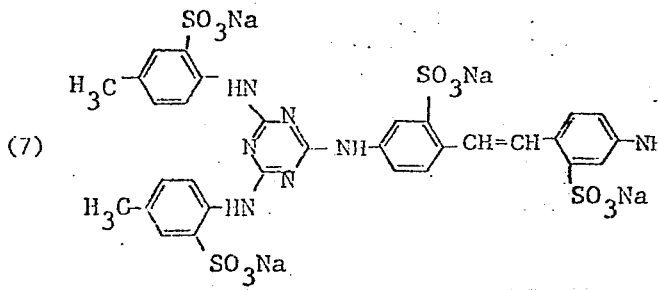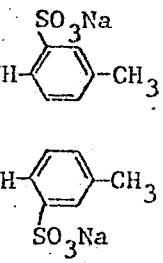

EXAMPLE 4

The fluorescent whitening agent of the formula (5) in the form of the sodium salt (2 g) is dissolved in 50 ml of hot (90°C) distilled water. On the other hand, a decomposed starch (80 g) is dissolved in hot (90°C) water. The fluorescent whitener solution is then worked into the starch solution and the resulting solution has a pH of 5.5 to 7.

The surface of a sized sheet of printing paper is coated with this size liquor in a sizing press and the coated paper is dried at approx. 90°–120°C in the drying compartment of the paper machine.

A sheet of paper is obtained whose whiteness degree is substantially improved.

Instead of sized paper it is possible to use sized cardboard with equal success.

Similar results are obtained under otherwise like conditions if a fluorescent whitening agent of the formula (6) or (7) is used instead of the fluorescent whitener of the formula (5).

EXAMPLE 5

To a solution of 5 g of the fluorescent whitening agent of the formula (5) in 40 ml of hot (90°C) distilled water is added 1,000 ml of an aqueous coating liquor which contains the following constituents:

35 g of commercially obtainable casein
80 f of a synthetic resin dispersion with a 50% synthetic resin content based on butadiene-styrene-polymers (e.g., DOW-LATEX 626, Dow. Chem. USA)
1 g of sodium polyphosphate
2 g of sulphated dedecylalcohol polyglycol ether with 15 ethylene oxide groups
400 g of aluminium magnesium silicate (china clay) and
15 g of conc. ammonia. The pH of this dispersion is about 9.0.

The surface of a sized sheet of paper or cardboard is coated with this coating liquor in a sizing press or some other coating device. A coated sheet of paper of extraordinary whiteness is obtained.

Similar results are obtained by using a fluorescent whitening agent of the formula (6) or (7).

EXAMPLE 6

A colloidal starch solution is prepared by stirring 75 g of an anionic starch [e.g., Perfectamyl A 2177 17 (AVEBE Holland)] cold in 600 ml of water and then dissolving it at 80°–90°C. To this solution are added 2 g of sodium polyphosphate, 2 g of sulphated dedecylalcohol polyglycol ether with 15 ethylene oxide groups, 3 ml of conc. ammonia, 75 g of a 50 percent synthetic resin dispersion based on a butadiene-styrene-copolymer (e.g., DOW-LATEX 636, Dow Chem. Corp. USA), a solution of 0.5 g of the fluorescent whitening agent of the formula (5) in 400 ml of water and finally, 500 g of an aluminium magnesium silicate white pigment, and the whole mixture is stirred to a homogeneous suspension.

A sheet of sized paper consisting of 50% each of bleached sulphite cellulose and wood pulp and having a surface pH of 4 is coated with the above described coating liquor in a coating device. A very fine, white, printable sheet of paper is obtained which may be used, for example, in offset printing.

Larger amounts of fluorescent whitener, for example 2 or 8 g, do not produce any undesirable discolouration, but a further increase in the white effect.

If 4 g of polyvinyl alcohol is added to the coating liquor described hereinbefore as diluent of the fluorescent whitener, the white effect is substantially increased.

Similar results are obtained by using a compound of the formula (6) or (7) instead of that of the formula (5).

EXAMPLE 7

A pigment coating liquor of the following compositions is prepared: 150 ml of a 50% aqueous synthetic resin dispersion based on a cross-linkable methacrylate/methylmethacrylate/styrene copolymer (e.g., ACRONAL S 320 D, BASF, Ludwigshafen am Rhein, West Germany), 100 ml of water containing 2 g of sodium polyphosphate, 600 ml of water containing 4 g of the fluorescent whitening agent of the formula (5), 50 ml of water containing 2 g of nonylphenolpentadecaglycol ether and 500 g of aluminium magnesium silicate (china clay Dinkie A).

A sheet of sized and charged sulphite cellulose crude paper is coated with this liquor and then dried. A sheet of brilliantly white, printable paper is obtained.

Similar results are obtained by using a fluorescent whitener of the formula (6) or (7).

EXAMPLE 8

An art paper coating liquor with a pH of 11 is obtained by mixing 500 ml of water containing 1 g of the fluorescent whitener of the formula (5), 35 g of casein, 12 ml of conc. ammonia, 75 ml of water containing 7.5 g of soda, 80 ml of a 50% synthetic resin dispersion based on a butadiene-styrene-copolymer (e.g., Dow Latex 636), 50 ml of water containing 1 g of sodium polyphosphate, 300 g of aluminium magnesium silicate (china clay SPS), 250 g of 40% $CaSO_4.10H_2O$ (satin white) and 50 ml of water containing 2 g of sulphated dodecylalcohol polyglycol ether with 10 to 20 ethylene oxide groups.

A sheet of sized paper or cardboard is coated on the surface with this coating liquor in a sizing press or other coating device. A coated sheet of paper of extraordinary whiteness is obtained.
Similar results are obtained by using the fluorescent whitener of the formula (6) or (7) instead of that of the formula (5).
We claim:
1. A compound of the formula
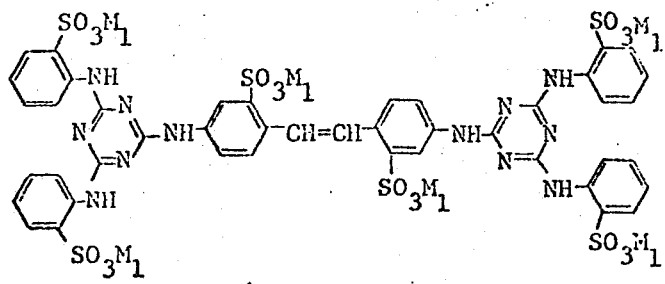
wherein $M_1$ represents a sodium, potassium or ammonium ion.